United States Patent Office.

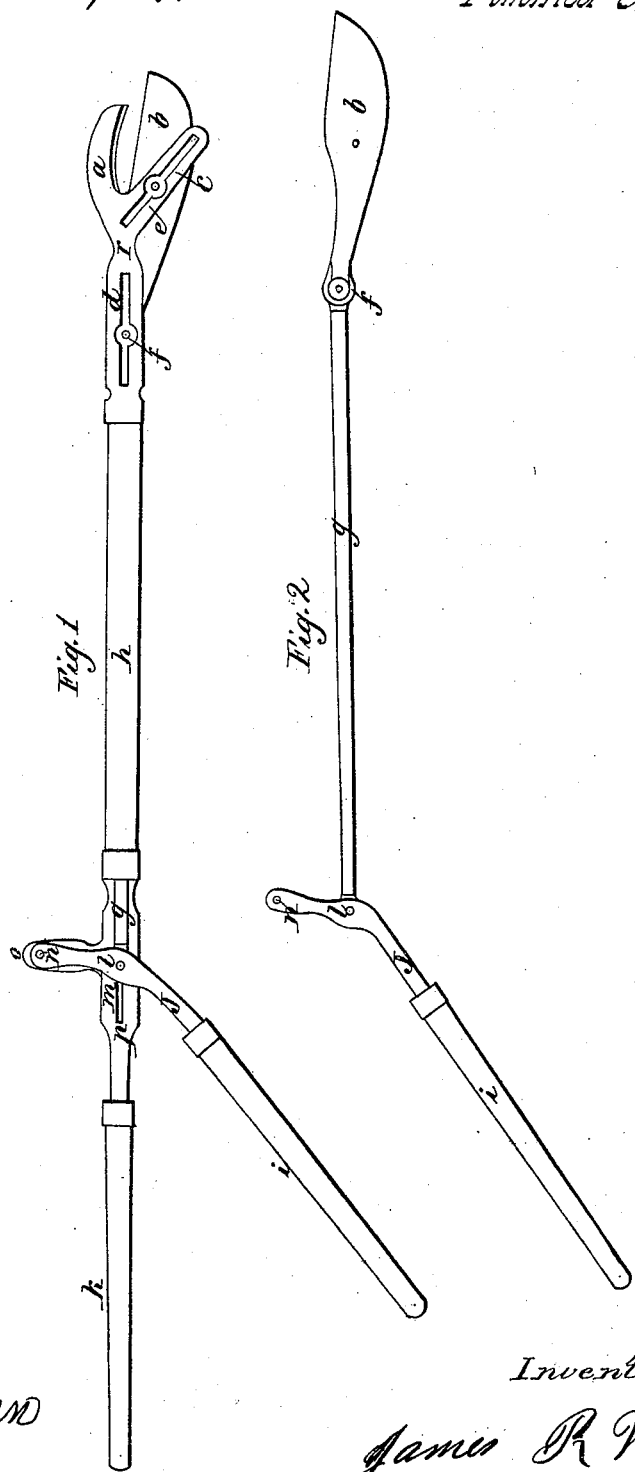

JAMES R. WOODWORTH, OF NUNDA, NEW YORK.

Letters Patent No. 96,294, dated October 26, 1869.

IMPROVEMENT IN PRUNING-IMPLEMENT.

The Schedule referred to in these Letters Patent and making part of the same

*To all whom it may concern:*

Be it known that I, JAMES R. WOODWORTH, of Nunda, in the county of Livingston, in the State of New York, have invented a new and useful Implement for Pruning Trees, Shrubs, &c.; and I do declare that the following is a full, clear, and exact description of the construction and operation of the same, reference being had to the annexed drawings, making a part of this specification, in which—

Figure 1 is a perspective view.

Figure 2 is a view of the blade, rod, and lever, detached from the other parts.

$h$ is a shaft or pole, either of wood or metal, either hollow, grooved, or solid. When made of wood, it should be grooved, so that the rod will pass near the centre. I commonly use half-inch gas-pipe, (inside measure,) with a quarter-inch rod.

P is a bed-piece, of malleable or wrought-iron, one end of which receives the handle $k$, and the other end is screwed on the end of the shaft $h$, or otherwise fastened thereto.

$r$ is a bed-piece, provided with slots, or their equivalent, to guide and hold the knife $b$, which is fastened by means of screws $f$ and $e$.

The screw $f$ passes through the bed-piece $r$, knife $b$, and rod $g$.

The screw $e$ passes through the slotted arm $c$, holding the knife, and also serving as a guide to open and shut the knife or shears.

The lower bed-piece P is provided with a slotted arm, $a$, through which a screw, $n$, passes, to the end of the lever J.

$l$ is a screw, passing through a slot, $m$, in the bed-piece P, fastening the rod $g$ to the lever J, and also serving as a guide to produce a parallel motion.

It will be seen that by raising or spreading the lever J, the knife $b$ will be shoved up, by means of the rod $g$, and the screw $e$, by following the slot or guide, will cause the shears to open. Then, by drawing the handles together, shuts them, thereby cutting off any limb or shrub that might be within the shears.

To shorten them, for low work, I take out the long shaft, and put in a shorter one, thereby altering the length of the implement, without altering either extremity, which is very convenient.

What I claim as my invention, and desire to secure by Letters Patent, is as follows:

1. The slotted bed-piece P, in the handle $k$, in combination with the lever J and rod $g$, by means of which the shears are operated, substantially in the manner described.

2. The pruning-shears, composed of bed-piece $r$, slotted arm $c$, and knife $b$, when operated by means of a lever, J, and rod, $g$, fastened to said lever, and secured thereto by a screw, working in the slotted arm-handle, substantially in the manner and for the purpose described.

JAMES R. WOODWORTH.

Witnesses:
JAMES LEMON,
SEELEY T. FOOTE.